(12) United States Patent
Chakrabarti et al.

(10) Patent No.: US 11,261,738 B2
(45) Date of Patent: Mar. 1, 2022

(54) DISTRIBUTED NESTED CELL DAMPING SYSTEM

(71) Applicant: GENERAL ELECTRIC COMPANY, Schenectady, NY (US)

(72) Inventors: Suryarghya Chakrabarti, Niskayuna, NY (US); Changjie Sun, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/309,467

(22) PCT Filed: Dec. 11, 2018

(86) PCT No.: PCT/US2018/065052
§ 371 (c)(1),
(2) Date: May 28, 2021

(87) PCT Pub. No.: WO2020/122886
PCT Pub. Date: Jun. 18, 2020

(65) Prior Publication Data
US 2021/0372286 A1    Dec. 2, 2021

(51) Int. Cl.
*F01D 5/16* (2006.01)
*F01D 5/18* (2006.01)

(52) U.S. Cl.
CPC .............. *F01D 5/16* (2013.01); *F01D 5/187* (2013.01); *F05D 2220/3215* (2013.01); *F05D 2260/20* (2013.01); *F05D 2260/94* (2013.01); *F05D 2260/96* (2013.01)

(58) Field of Classification Search
None
See application file for complete search history.

(56) References Cited

U.S. PATENT DOCUMENTS

| 9,470,095 | B2 | 10/2016 | Propheter-Hinckley et al. |
| 10,209,009 | B2 * | 2/2019 | Gerstler ............... F28D 9/0093 |
| 10,704,841 | B2 * | 7/2020 | Manzo .................... F28F 27/00 |
| 2006/0249875 | A1 * | 11/2006 | Robb .................... B29C 64/153 264/239 |
| 2008/0290215 | A1 | 11/2008 | Udall et al. |
| 2009/0304517 | A1 | 12/2009 | Strother |
| 2016/0115822 | A1 | 4/2016 | Cortequisse |

(Continued)

*Primary Examiner* — Juan G Flores
*Assistant Examiner* — Jason Fountain
(74) *Attorney, Agent, or Firm* — McNees Wallace & Nurick LLC

(57) ABSTRACT

A nested lattice structure for use in a damping system for a turbine blade includes a first lattice structure including: a first outer passage including a hollow interior; a second outer passage including a hollow interior; and an outer node including a hollow interior and forming an intersection of the first outer passage and the second outer passage. The nested lattice structure includes a second lattice structure nested within the hollow interior of the first lattice structure. The second lattice structure includes: a first inner passage; a second inner passage; and an inner node forming an intersection of the first inner passage and the second inner passage. Each of the first inner passage, the second inner passage, and the inner node are nested within the respective first outer passage, the second outer passage, and the outer node.

20 Claims, 2 Drawing Sheets

(56) References Cited

U.S. PATENT DOCUMENTS

2017/0367218 A1* 12/2017 Gerstler .................. F28F 1/045
2018/0187984 A1*  7/2018 Manzo ...................... F28F 7/02
2018/0334909 A1  11/2018 Mongillo et al.

* cited by examiner

DISTRIBUTED NESTED CELL DAMPING SYSTEM

BACKGROUND

The present subject matter relates generally to systems and mechanisms for vibration damping, and more specifically to nested lattice vibration damping systems.

Large industrial gas turbine (IGT) blades are exposed to unsteady aerodynamic loading which causes the blades to vibrate. If these vibrations are not adequately damped, they may cause high cycle fatigue and premature blade failure. The last-stage blade (LSB) is the tallest and therefore is the most vibrationally challenged component of the turbine. Conventional vibration damping methods for turbine blades include platform dampers, damping wires, and shrouds.

Platform dampers sit underneath the blade platform and are effective for medium and long shank blades, which have motion at the blade platform. IGT aft-stage blades have short shanks to reduce the weight of the blade and in turn reduce the pull load on the rotor which renders platform dampers ineffective.

IGT LSBs are often damped primarily via shrouds. Shrouds can be at the blade tip (tip-shroud) or at a partial span between the hub and tip (part-span shroud). Partial span and tip shrouds contact adjacent blades and provide damping when they rub against each other. Shrouds also provide an efficient way to tune or adjust the blade natural frequencies.

While shrouds provide damping and stiffness to the airfoil, they make the blade heavier, which in turn increases the pull load on the rotor, thereby increasing the weight and cost of the rotor. Thus light-weight solutions for aft-stage blades are attractive and may drive increases in the overall power output of the machine. Shrouds may also create aero performance debits. Tip-shrouds need a large tip fillet to reduce stress concentrations, which creates tip losses. Part-span shrouds create an additional blockage in the flow path and reduce aerodynamic efficiency. Lastly, it has been shown that tip shrouds induce significant twist in the vibration mode shapes of the blade causing high aeroelastic flutter instability.

BRIEF DESCRIPTION OF THE EMBODIMENTS

Aspects of the present embodiments are summarized below. These embodiments are not intended to limit the scope of the present claimed embodiments, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one aspect, a nested lattice structure 29 for use in a damping system includes a first lattice structure 26 including: a first outer passage 30 including a hollow interior 45; a second outer passage 32 including a hollow interior; and an outer node 42 including a hollow interior and forming an intersection of the first outer passage 30 and the second outer passage 32. The nested lattice structure 29 includes a second lattice structure 28 nested within the hollow interior of the first lattice structure 26 including: a first inner passage 44; a second inner passage 46; and an inner node 50 forming an intersection of the first inner passage 44 and the second inner passage 46. Each of the first inner passage 44, the second inner passage 46 and the inner node 50 are nested within the respective first outer passage 30, the second outer passage 32 and the outer node 42.

In another aspect, a vibration damping system 24 includes: a plurality of nested nodes connected to each other, each nested node including: a first lattice structure 26 including: a first outer passage 30 including a hollow interior 45; a second outer passage 32 including a hollow interior; and an outer node 42 including a hollow interior. The outer node 42 forms an intersection of the first outer passage 30 and the second outer passage 32. The plurality of nested nodes includes a second lattice structure 28 nested within the hollow interior of the first lattice structure 26. The second lattice structure 28 includes: a first inner passage 44; a second inner passage 46; and an inner node 50 forming an intersection of the first inner passage 44 and the second inner passage 46. Each of the first inner passage 44, the second inner passage 46 and the inner node 50 are nested within the respective first outer passage 30, the second outer passage 32, and the outer node 42. At least one of the first outer passage 30 and the second outer passage 32 of each of the nested nodes is coupled to at least one passage of an adjacent nested node 29.

In another aspect, a turbine blade includes: a blade portion 10 including: an airfoil extending from a root portion 12 to a tip portion 14 and from a leading edge 16 to a trailing edge 18. The turbine blade 10 includes a damping system 24 disposed within the blade portion 10. The damping system 24 includes: a first lattice structure 26 including a hollow interior; and a second lattice structure 28 nested within the hollow interior of the first lattice structure 26. Each of the first and second lattice structures 26, 28 dampen vibrations from the blade portion 10.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of a gas turbine engine.

As used herein, the term "circumferential" refers to a direction or directions around (and tangential to) the outer circumference of the gas turbine engine, or for example the circle defined by the swept area of the rotor of the gas turbine engine. As used herein, the terms "circumferential" and "tangential" may be synonymous.

As used herein, the term "radial" refers to a direction moving outwardly away from the central axis of the gas turbine engine. A "radially inward" direction is aligned toward the central axis moving toward decreasing radii. A "radially outward" direction is aligned away from the central axis moving toward increasing radii.

The embodiments described herein include distributed vibration damping structures internal to large aft-stage industrial gas turbine blades, among other applicable components. These damper structures work on the principle of nested lattice structures. If designed properly, these dampers can eliminate the need for turbine blade shrouds, significantly increasing the aft-stage $AN^2$ entitlement, as well as the power output of large industrial gas turbines, (where $AN^2$ is the flow path annulus area multiplied by the square of the rotor speed (RPM)).

Figure 1:
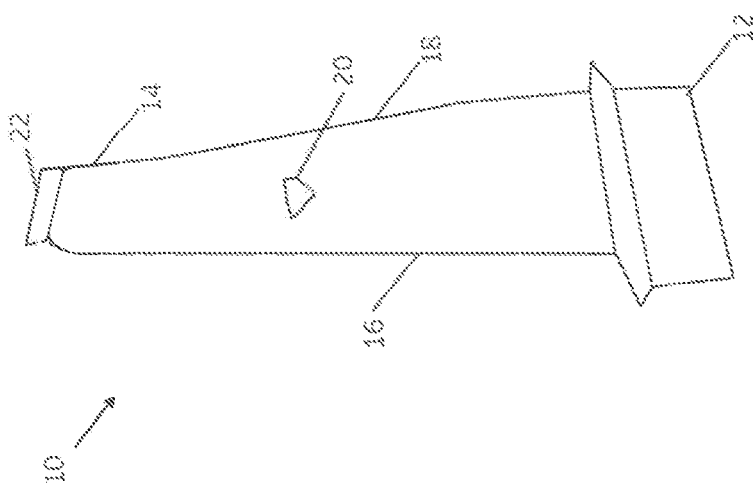
FIG. 1 is a perspective representation of a turbine blade with mid-span shrouds and tip shrouds.

FIG. 1 illustrates an exemplary turbine blade 10, extending from a root portion 12 to a tip portion 14, and from a leading edge 16 to a trialing edge 18. The turbine blade illustrated in FIG. 1 also includes a partial span shroud 20 and a tip shroud 22.

Figure 2:
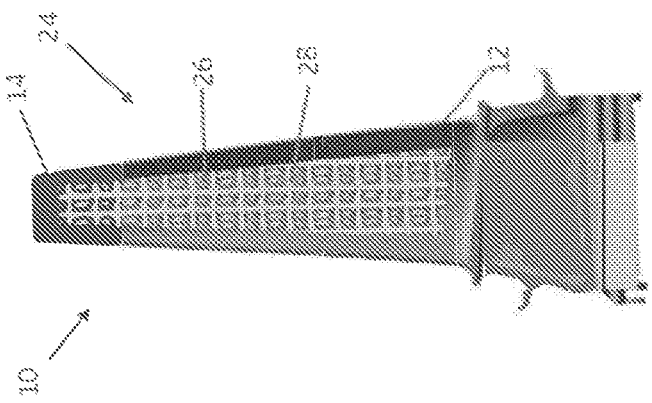
FIG. 2 is a side-view representation of a turbine blade with an internal damping system.

FIG. 2 illustrates a turbine blade 10 according to the embodiments disclosed herein including an internal damping system 24 including a first lattice structure 26, and a second lattice structure 28 nested within the first lattice structure 26. The embodiment of FIG. 2 utilizes the internal damping system 24 rather than the partial span shrouds 20 and/or tip shrouds 22 of FIG. 1.

Figure 3:
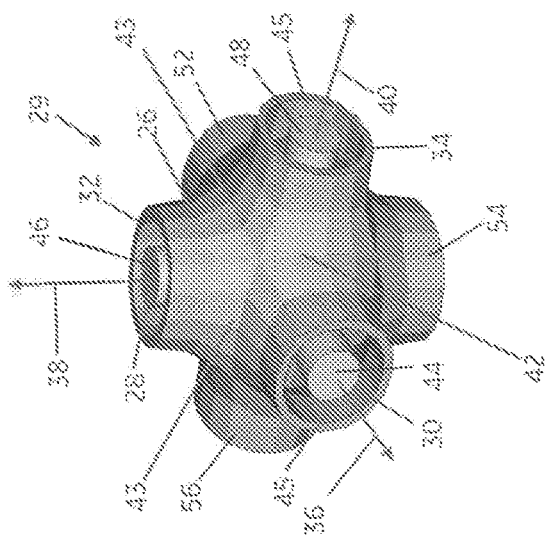
FIG. 3 is a perspective view of nested nodes.

FIG. 3 illustrates an enlarged perspective view of a portion of the second lattice structure 28 nested within a portion of the first lattice structure 26. The portion of the first lattice structure 26 illustrated in FIG. 3 includes a first outer passage 30 aligned in a circumferential direction 36, a second outer passage 32 aligned in a radial direction 38, and a third outer passage 34 aligned in an axial direction 40. The first, second, and third outer passages 30, 32, 34 intersect at an outer node 42. Nested within the portion of the first lattice structure 26 is a portion of the second lattice structure 28 which includes a first inner passage 44 aligned in a circumferential direction 36, a second inner passage 46 aligned in a radial direction 38, and a third inner passage 48 aligned in an axial direction 40. The first, second, and third inner passages 44, 46, 48 intersect at an inner node 50 (not shown) located in the center of the outer node 40. Each of the first, second, and third inner passages 44, 46, 48 are centrally disposed within the respective first, second, and third outer passages 30, 32, 34. As such, each of the first and second lattice structures 26, 28 may include a three-dimensional frame work made up with inner and/or outer nodes 50, 40 forming the intersections of inner and/or outer passages 44, 46, 48, 30, 32, 34 substantially aligned in the circumferential, radial and axial directions 36, 38, 40. The outer and inner nodes 42, 50 collectively define a pair of nested nodes 29 (or nested cells 29).

Referring still to FIG. 3, the first lattice structure 26 may also include a fourth outer passage 52 aligned circumferentially and extending away from the outer node 40 in an opposite direction from that of the first outer passage 30. The first lattice structure 26 may also include a fifth outer passage 54 aligned radially and extending away from the outer node 40 in an opposite direction from that of the second outer passage 32. The first lattice structure 26 may also include a sixth outer passage 56 aligned axially and extending away from the outer node 40 in an opposite direction from that of the third outer passage 34. Similarly, the second lattice structure 28 may also include fourth, fifth, and sixth inner passages (not shown) extending on the opposites sides of the inner node 50 from the first, second, and third inner passages 44, 46, 48 respectively. In addition, the fourth, fifth, and sixth inner passages (not shown) may be centrally disposed within the respective fourth, fifth, and sixth outer passages 52, 54, 56. At least one annulus 45 may be defined within the space between the inner diameter of each outer passage and the outer diameter of the respective nested inner passage.

Still referring to FIG. 3, each of the first though sixth outer passages 30, 32, 34, 52, 54, 56 may include a larger cross-sectional area than each of the first through sixth inner passages 44, 46, 48 to allow the inner passages 44, 46, 48 to fit within the outer passages 30, 32, 34, 52, 54, 56. Each of the first though sixth outer passages 30, 32, 34, 52, 54, 56 may be substantially hollow thereby including space for the inner passages 44, 46, 48. The inner passages 44, 46, 48 may be substantially solid and/or substantially hollow. In embodiments where the inner passages 44, 46, 48 are substantially solid, the cross-sectional area of the substantially solid inner passage material may provide enhanced mechanical stress characteristics compared to the embodiments in which the inner passages are substantially hollow. In embodiments where the inner passages 44, 46, 48 are substantially hollow, the spaces internal to the inner passages 44, 46, 48 may serve to provide room for a third nested lattice structure. In other embodiments where the inner passages 44, 46, 48 are substantially hollow, the spaces internal to the inner passages 44, 46, 48 may serve as conduits for cooling fluids for the purpose of internally cooling the first and/or second lattice structures 26, 28, and/or for the purpose of delivering cooling to another structure or surface of the turbine blade 10. Each of the inner and outer passages 44, 46, 48, 30, 32, 34, 52, 54, 56 may connect with corresponding inner and outer passages of an adjacent inner and/or outer node 40, 50, thereby forming nested three-dimensional grids and/or lattice structures. Each of the inner and outer passages 44, 46, 48, 30, 32, 34, 52, 54, 56 may be oriented such that they are substantially orthogonal to, linear with, and/or parallel with other inner and outer passages. In other embodiments, each of the inner and outer passages 44, 46, 48, 30, 32, 34, 52, 54, 56 may be oriented such that they form other angles (i.e., non-orthogonal) with other inner and/or outer passages. Each of the first and second lattice structures 26, 28 may include at least one contoured portion 43 that forms a gradual transition between adjacent inner and outer passages 44, 46, 48, 30, 32, 34, 52, 54, 56.

Figure 4:
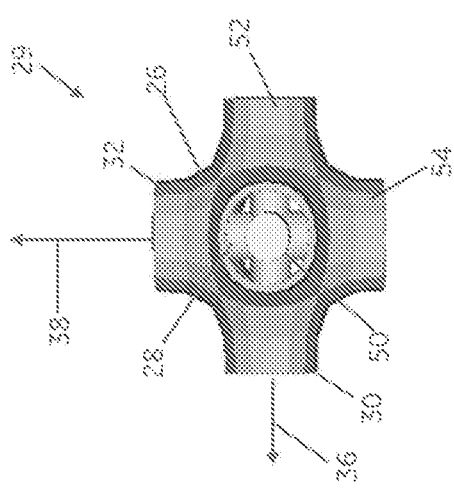
FIG. 4 is a side view of nested nodes.

FIG. 4 illustrates an enlarged side view of a portion of the second lattice structure 28 nested within a portion of the first lattice structure 26, defining a pair of nested nodes (or nested cells) 29. Similar to the embodiment of FIG. 3, the first lattice structure 26 includes first, second, fourth, and fifth outer passages 30, 32, 52, 54 aligned along the circumferential 36 and/or radial 38 directions. In the embodiment of FIG. 4, the axial direction 40 is oriented into and/or out of the page (i.e., into or out of the plane of FIG. 4), and is therefore hidden from view. FIG. 4 also illustrates the inner node 50, which forms the intersection of the inner passages.

Figure 5:
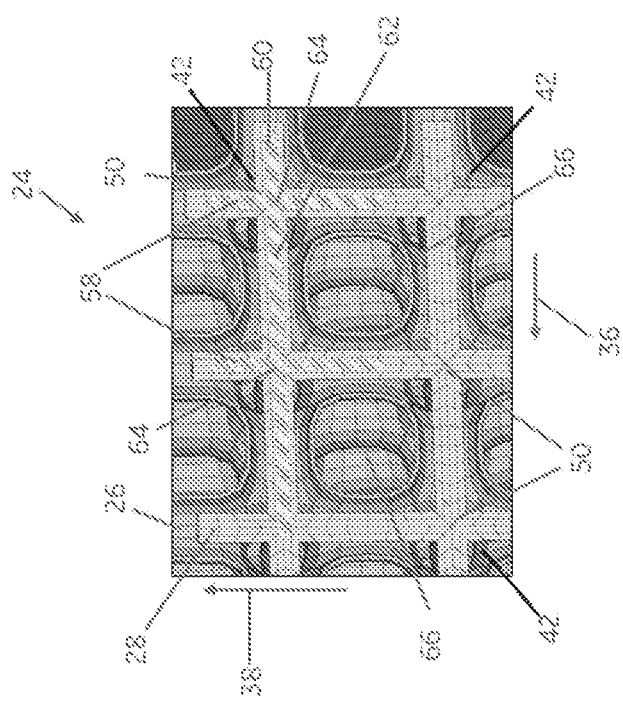
FIG. 5 is a side view of nested lattice structures.

FIG. 5 illustrates an enlarged side view of a portion of the second lattice structure 28 nested within a portion of the first lattice structure 26, defining a damping system 24 (or portion thereof). The damping system 24 of FIG. 5 includes a plurality of inner nodes 50, nested within a plurality of outer nodes 42. Each of the first and second lattice structures 26, 28 includes a plurality of outer and/or inner passages aligned in each of the circumferential 36 and radial 38 directions. Each of the first and second lattice structures 26, 28 may also include a plurality of outer and/or inner passages aligned in the axial direction 40, which are not shown in the side view of FIG. 5. The first and second lattice structures 26, 28 may also define a plurality of interstitial spaces 66 in the volumes and/or spaces that are not occupied by the outer and inner passages, nor by the outer and/or inner nodes 42, 50.

Referring still to FIG. 5, the damping system 24 may also include a third lattice structure 60 nested within the second lattice structure 28. The third lattice structure 60 may include a plurality of radial tertiary passages 58 (aligned in the radial direction 38), as well as a plurality of circumferential tertiary passages 62 (aligned in the circumferential direction 36). The third lattice structure 60 may also include a plurality of axial tertiary passages (not shown in the side view of FIG. 5), the plurality of axial tertiary passages being aligned in the axial direction 40. The third lattice structure 60 may also include a plurality of tertiary nodes 64 nested within the inner nodes 50, which in turn are nested within the outer nodes 42. Each of the plurality of tertiary nodes 64 may be defined by an intersection of the circumferential, radial, and/or axial tertiary passages 62, 58. Each of the first, second, and third lattice structures 26, 28, 60 may be dimensioned such that the respective nesting may occur, and also to allow enough space for relative movement between each of the first, second, and third lattice structures 26, 28, 60 to occur. As such, the inner diameter of each of the outer passages must be larger than the outer diameter of each of the inner passages. Similarly, in embodiments that include a third lattice structure 60, the inner diameter of each of the inner passages must be larger than the outer diameter of each of the tertiary passages. Similarly, the outer node 42, the inner node 50, and the tertiary node 64 must be appropriately dimensioned to allow for both the nesting, as well as enough space to allow relative movement therebetween. For example, in one embodiment, the outer diameter of each of the outer passages 30, 32, 34, 52, 54, 56 may be from about 2 to about 4 times the outer diameter of each of the inner passages 44, 46, 48. In another embodiment, the inner diameter of each of the outer passages 30, 32, 34, 52, 54, 56 may be from about 1.5 to about 3.5 times the outer diameter of each of the inner passages 44, 46, 48. In other embodiments, the second and third lattice structures may include similar relative dimensions.

Figure 6:
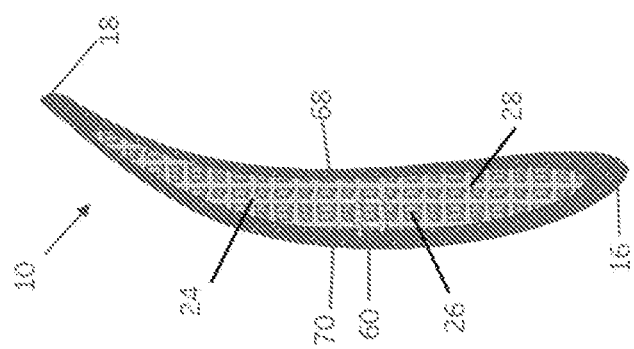
FIG. 6 is a radially inward view of a turbine blade, according to aspects of the embodiments disclosed herein.

FIG. 6 illustrates a top view (i.e., radially inward looking) of the turbine blade 10 including a first lattice structure 26, a second lattice structure 28, and a third lattice structure 60. Each of the first, second, and third lattice structures 26, 28, 60 may be coupled to the airfoil leading edge 16, the trailing edge 18, the pressure side 68, and/or the suction side 70. In addition, each of the first, second, and third lattice structures 26, 28, 60 may be coupled to the pressure side 68, and/or the suction side 70 at a portion of the turbine blade proximate the leading edge 16 and/or the trailing edge 18. For example, each of the first, second, and third lattice structures 26, 28, 60 may be coupled to the pressure side 68, and/or the suction side 70 at a location that is within about 0% to about 15% of an airfoil chord length from the leading edge 16 and/or the trailing edge 18. In other embodiments, each of the first, second, and third lattice structures 26, 28, 60 may be coupled to the pressure side 68, and/or the suction side 70 at a mid-chord location that is about 40% to about 60% of the airfoil chord length from the leading edge 16 and/or the trailing edge 18. Each of the first, second, and third lattice structures 26, 28, 60 may also be coupled at or proximate to an airfoil root portion 12 (shown in FIG. 2) and/or an airfoil tip portion 14 (shown in FIG. 2). In each of the embodiments described herein, the first, second and/or third lattice structures 26, 28, 60 must be coupled to a different portion of the blade, thereby allowing each lattice structure 26, 28, 60 to absorb vibrations from one portion of the blade and transfer them into one or more other lattice structures 26, 28, 60. Stated otherwise, by coupling each of the first, second, and/or third lattice structures 26, 28, 60 to different portions of the interior of the blade 10, relative motion between the lattice structures 26, 28, 60 may occur, thereby allowing the absorbed vibrations from various portions of the blade 10 to be dampened via a loss mechanism (such as friction with the other lattice structure or structures 26, 28, 60, viscous damping, etc.).

Referring still to FIG. 6, in one embodiment, the first lattice structure 26 is coupled to the suction side 70 within about 15% of the airfoil chord length from the leading edge 16, and the second lattice structure 28 is coupled to the pressure side 60 within about 15% of the airfoil chord length from the trailing edge 18. This embodiment may also include a third lattice structure 60 coupled to the suction side 70 at a location that is between about 40% and about 60% of the airfoil chord length from the leading edge 16, and/or the trailing edge 18. In this embodiment, the first lattice structure 26 may be attached to a portion of the blade 10 that exhibits a different vibratory mode and/or characteristic than the portion of the blade 10 to which the second lattice structure 28 is coupled to (and similarly for the third lattice structure 60). In another embodiment, the first lattice structure 26 may be coupled to (and optionally dimensioned to match a vibratory mode of) the root portion 12 of the turbine blade 10 while the second lattice structure 28 may be coupled to (and optionally dimensioned to match a vibratory mode of) the tip portion 14 of the turbine blade 10.

By coupling each of the first, second, and third lattice structures 26, 28, 60 to only a single portion (albeit different portions) of the turbine blade 10, and by dimensioning the first, second, and third lattice structures 26, 28, 60 to allow relative motion therebetween, the damping system 24 may simultaneously dampen multiple vibratory modes from multiple locations on the turbine blade 10. Relative motion between lattice structures may also occur as a result of the different portions of the blade to which each lattice structure 26, 28, 60 is coupled. In addition, when each of the first, second, and third lattice structures 26, 28, 60 move relative to each other, the respective outer, inner, and tertiary passages and nodes may come into contact with each other, thereby enabling each lattice structure to transfer and/or distribute vibrations into at least one other lattice structure. As such, a dual mode damping system may be achieved with the embodiments disclosed herein; a first mode of damping occurs when each of the first, second, and third lattice structures 26, 28, 60 contact each other as a result of relative motion therebetween, thereby causing friction and thereby dampening any absorbed vibrations. A second mode of damping (i.e., viscous damping) may occur when any of the first, second, and third lattice structures 26, 28, 60 moves and displaces one or more fluids and/or powders that may be disposed in the spaces and/or volumes between lattice structures 26, 28, 60.

In operation, gas turbine last stage blades may undergo large static deformation when the blades 10 are subjected to centrifugal loads, gas loads, and/or thermal loads. The lattice structures may be designed such that they do not touch each other at cold condition but come in contact with each other under operating condition once the blade undergoes static deformation, thereby creating a contact preload between the two or more lattice structures 26, 28, 60. A CTE (coefficient of thermal expansion) mismatch (i.e., differential thermal growth) between lattice structures may also be used to create friction and/or relative motion between lattice structures 26, 28, 60. Any vibration of the blade and hence relative motion between the lattice structures may be opposed by frictional forces generated at the contact locations between the lattice structures. These friction forces may serve to damp out blade vibrations.

In one aspect of the embodiments disclosed herein, the first, second, and/or third lattice structures 26, 28, 60 may be designed such that they do not come in contact during engine operating conditions. Instead, the spaces between the two or more lattice structures 26, 28, 60 may be filled with a fluid such that when blade vibration causes relative motion between the lattices 26, 28, 60, the fluid is forced to flow through narrow passages in the unit cell and/or nested nodes providing viscous energy dissipation (and damping) in the fluid. As such, the damping system 24 according to the embodiments described herein may include at least one fluid and/or liquid disposed between the first, second, and/or third lattice structures 26, 28, 60 (i.e., for example within the at least one annulus 43 shown in FIG. 3). In another embodiment, the space between the first, second, and/or third lattice structures 26, 28, 60 may be filled with a metallic powder such that the lattice structures are forced to exert force into the powder during relative motion therebetween, thereby dissipating vibrations and/or energy.

The first, second, and third lattice structures 26, 28, 60 may be manufactured via any suitable manufacturing process including via additive manufacturing and investment casting. Using some manufacturing modalities, the lattice structures may be restricted to fewer topologies. In some embodiments, it may be desirable to form lattice structures and/or features thereof separately, and then to subsequently assemble and join the parts together via one or more joining techniques such as welding. In other embodiments, the first, second, and third lattice structures 26, 28, 60 may be formed currently using a single and/or multiple continuous and/or non-continuous additive manufacturing build processes. In embodiments where the first, second, and/or third lattice structures 26, 28, 60 are composed of different materials, it may nonetheless be possible to form the first, second, and third lattice structures 26, 28, 60 concurrently using an additive manufacturing system that includes multiple print heads, where each print head of the multiple print heads is configurable to print using a different material than that of the other print heads. The first, second, and/or third nested lattice structures 26, 28, 60 may be formed during the same additive manufacturing and/or investment casting process as the turbine blade 10. In other embodiments, the first, second, and/or third nested lattice structures 26, 28, 60 may be formed separately from the turbine blade 10 (which may be formed in two halves), and then joined to one or more portions of the interior of the turbine blade 10, as discussed above, via welding, brazing, and/or other suitable processes. In other embodiments, the blade 10 may be cast and/or printed up to about 60%-80% of the blade span and the blade tip (including one or more internal lattice structures 26, 28, 60) may be formed separately via casting, additive manufacturing and/or other suitable process. The blade tip may then be joined to the root portion via welding, brazing, and/or other suitable joining process. In other embodiments, the first, second, and/or third lattice structures 26, 28, 60 may be printed directly into, onto, or within a cast blade that includes cast-in cavities in which the lattice structures may be disposed.

Although this disclosure is primary directed towards turbine blade applications, damping technology and embodiments disclosed herein may be applied to other vibrating components in gas turbines, other machinery, and/or other components where conventional external dampers are not feasible (or not preferred). The damping system 24 and lattice structures 26, 28, 60 disclosed herein may be used in connection with turbine tip shrouds 22 and/or partial span shrouds 20. For example, a turbine blade may include a partial span 20 shroud as well as a damping system 24 according to the embodiments disclosed herein in place of a tip shroud 22. In other embodiments, the turbine blade 10 may include a tip shroud 22 as well as a damping system 24 according to the embodiments disclosed herein in place of a partial span shroud 20.

Each of the first, second, and third lattice structures 26, 28, 60 may be designed such that the first natural frequency of the vibrating structure targets a specific natural frequency of the turbine blade 10 to be damped. In this way the different sizes of the first, second, and third lattice structures 26, 28, 60 and features thereof may target all modes of interest. However, it is not required that the first, second, and/or third lattice structures 26, 28, 60 be tuned or designed with a specific geometry, as long as they are coupled to different portions of the turbine blade 10, such that the different portions of the turbine blade 10 include different vibratory modes causing relative motion between lattice structures. Each of the first, second, and third lattice structures 26, 28, 60 may be at least partially composed of Inconel 738, Inconel 625, and/or other suitable nickel-based superalloys with 1000° F. temperature capability, as well as equivalent coefficients of thermal expansion. In one embodiment, the material of the first, second, and third lattice structures 26, 28, 60 may be selected such that it substantially matches the coefficient of thermal expansion of the substrate material (i.e., the material of the turbine blade 10). In other embodiments, the material of the first, second, and third lattice structures 26, 28, 60 may be selected such that they have different CTE, thereby causing contact preload due to differential thermal growth. The contact preload may aid in energy dissipation due to the friction between lattice structures, due to the different portions of the blade 10 vibrating relative to each other. Each of the first, second, and third lattice structures 26, 28, 60 may be composed of the same material and/or different materials, and each may include an impact resistant coating. The embodiments disclose herein may include two nested lattice structures, three nested lattice structures, as well as four nested lattice structures and even higher numbers of nested lattice structures. In addition, each lattice structure may include three or less dimensions. For example, a two-dimensional inner lattice structure 28, may be nested within a three-dimensional outer lattice structure 26. Similarly, a three-dimensional inner lattice structure 28, may be at least partially nested within a two-dimensional outer lattice structure 26. In another embodiment, a two-dimensional third lattice structure 60 (attached to a first portion of the interior of the turbine blade 10), may be nested within a two-dimensional second lattice structure 28 (attached to a second portion of the interior of the turbine blade 10), which in turn is nested within a three-dimensional first lattice structure 26. As used herein, the term "two-dimensional lattice structure" may include features of a three-dimensional lattice structure that are contained within a single geometric plane.

Exemplary applications of the present embodiments may include steam turbine blades, gas turbine blades, rotary engine blades and components, compressor blades and impellers, combustor modules, combustor liners, exhaust nozzle panels, aircraft control surfaces, reciprocating engine components, air-cooled condenser fan blades, bridges, aircraft engine fan blades, structures and surfaces of aircraft, structures and surfaces of automobiles, structures and surfaces of locomotives, structures, components and surfaces of machinery, and/or other components in which there is a desire to damp vibrations.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A nested lattice structure for use in a damping system for a turbine blade, the nested lattice structure comprising:
   a first lattice structure comprising:
      a first outer passage comprising a hollow interior;
      a second outer passage comprising a hollow interior; and
      an outer node comprising a hollow interior, the outer node forming an intersection of the first outer passage and the second outer passage;
   a second lattice structure nested within the hollow interior of the first lattice structure, the second lattice structure comprising:
      a first inner passage;
      a second inner passage; and
      an inner node, the inner node forming an intersection of the first inner passage and the second inner passage;
   wherein each of the first inner passage, the second inner passage, and the inner node are nested within the respective first outer passage, the second outer passage, and the outer node.

2. The nested lattice structure of claim 1, wherein the first lattice structure further comprises a third outer passage comprising a hollow interior, the third outer passage extending outwardly from the outer node, wherein the outer node and the first, second, and third outer passages collectively define a three-dimensional outer lattice structure.

3. The nested lattice structure of claim 2, wherein the third outer passage is orthogonal to each of the first and second outer passages.

4. The nested lattice structure of claim 1, wherein the second lattice structure further comprises a third inner passage, wherein the inner node and the first, second, and third inner passages collectively define a three-dimensional inner lattice structure.

5. The nested lattice structure of claim 1, wherein the first and second outer passages are orthogonal to each other.

6. The nested lattice structure of claim 1, wherein the first and second inner passages are solid.

7. The nested lattice structure of claim 1, wherein the inner node and the first and second inner passages are hollow.

8. The nested lattice structure of claim 7, further comprising a third lattice structure nested within the second lattice structure.

9. The nested lattice structure of claim 8, wherein the third lattice structure further comprises:
   a first tertiary passage; and
   a second tertiary passage,
   wherein the first and second tertiary passages are aligned within a two-dimensional plane of the third lattice structure.

10. The nested lattice structure of claim 9, wherein the first lattice structure further comprises a third outer passage comprising a hollow interior, wherein the outer node and the first, second, and third outer passages collectively define a three-dimensional outer lattice structure;
   wherein the second lattice structure further comprises a third inner passage, wherein the inner node and the first, second, and third inner passages collectively define a three-dimensional inner lattice structure;
   wherein the first and second outer passages are orthogonal to each other; and
   wherein the third outer passage is orthogonal to each of the first and second outer passages.

11. The nested lattice structure of claim 1, wherein the first lattice structure is coupled to a first portion of the turbine blade.

12. The nested lattice structure of claim 11, wherein the second lattice structure is coupled to a second portion of the turbine blade; and
   wherein relative motion between the first lattice structure and the second lattice structure causes friction therebetween, thereby dissipating at least one vibration.

13. The nested lattice structure of claim 1, wherein an outer diameter of the first outer passage is between about 2 and about 4 times an outer diameter of the first inner passage.

14. The nested lattice structure of claim 1, wherein an inner diameter of the first outer passage is between about 1.5 and about 3.5 times an outer diameter of the first inner passage.

15. The nested lattice structure of claim 1, further comprising at least one of a fluid and a powder disposed between the first lattice structure and the second lattice structure.

16. A vibration damping system for a turbine blade, the vibration damping system comprising:
a plurality of nested nodes connected to each other, each nested node of the plurality of nested nodes comprising:
a first lattice structure comprising:
a first outer passage comprising a hollow interior;
a second outer passage comprising a hollow interior; and
an outer node comprising a hollow interior, the outer node forming an intersection of the first outer passage and the second outer passage;
a second lattice structure nested within the hollow interior of the first lattice structure, the second lattice structure comprising:
a first inner passage;
a second inner passage; and
an inner node, the inner node forming an intersection of the first inner passage and the second inner passage;
wherein each of the first inner passage, the second inner passage, and the inner node are nested within the respective first outer passage, the second outer passage, and the outer node, and
wherein at least one of the first outer passage and the second outer passage of each of the nested nodes is coupled to at least one passage of an adjacent nested node.

17. The vibration damping system of claim 16, further comprising at least one of a fluid and a powder disposed between the first lattice structure and the second lattice structure.

18. A turbine blade comprising:
a blade portion, the blade comprising:
an airfoil extending from a root portion to a tip portion and from a leading edge to a trailing edge;
a damping system disposed within the blade portion, the damping system comprising:
a first lattice structure comprising a hollow interior; and
a second lattice structure nested within the hollow interior of the first lattice structure;
wherein each of the first and second lattice structures dampen vibrations from the blade portion.

19. The turbine blade of claim 18, wherein the first lattice structure is coupled to the root portion of the blade portion, and
wherein the second lattice structure is coupled to the tip portion of the blade portion.

20. The turbine blade of claim 18, wherein the first lattice structure is coupled to the leading edge of the blade portion, and
wherein the second lattice structure is coupled to the trailing edge of the blade portion.

* * * * *